(12) United States Patent
Ulasen et al.

(10) Patent No.: US 12,277,757 B2
(45) Date of Patent: Apr. 15, 2025

(54) SYSTEMS AND METHODS FOR COLOR-BASED OUTFIT CLASSIFICATION USING SEMANTIC EMBEDDINGS

(71) Applicant: Acronis International GmbH, Schaffhausen (CH)

(72) Inventors: Sergey Ulasen, Saint-Petersburg (RU); Alexander Snorkin, Moscow (RU); Andrey Adaschik, Saint-Petersburg (RU); Artem Shapiro, Dnipro (UA); Vasyl Shandyba, Dnipro (UA); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 436 days.

(21) Appl. No.: 17/731,875

(22) Filed: Apr. 28, 2022

(65) Prior Publication Data

US 2022/0406045 A1 Dec. 22, 2022

Related U.S. Application Data

(60) Provisional application No. 63/212,181, filed on Jun. 18, 2021.

(51) Int. Cl.
*G06V 10/82* (2022.01)
*G06V 10/56* (2022.01)
*G06V 10/764* (2022.01)

(52) U.S. Cl.
CPC .............. *G06V 10/82* (2022.01); *G06V 10/56* (2022.01); *G06V 10/764* (2022.01)

(58) Field of Classification Search
CPC ...... G06V 10/82; G06V 10/56; G06V 10/764; G06V 20/42
See application file for complete search history.

(56) References Cited

U.S. PATENT DOCUMENTS

| | | | |
|---|---|---|---|
| 2010/0318971 A1* | 12/2010 | Nagle | G06F 11/3672 717/125 |
| 2020/0371524 A1* | 11/2020 | Parchami | G06N 3/045 |
| 2021/0027497 A1* | 1/2021 | Ding | G06T 7/11 |
| 2021/0142487 A1* | 5/2021 | Xu | A61B 34/20 |
| 2021/0160975 A1* | 5/2021 | Cremer | H05B 45/20 |
| 2021/0224312 A1* | 7/2021 | Harikumar | G06F 16/532 |
| 2021/0225052 A1* | 7/2021 | Marzorati | G06N 20/00 |
| 2021/0374975 A1* | 12/2021 | Shoeb | G06T 7/174 |
| 2022/0391433 A1* | 12/2022 | Maheshwari | G06N 3/0464 |

* cited by examiner

*Primary Examiner* — Amara Abdi
(74) *Attorney, Agent, or Firm* — ArentFox Schiff LLP; Michael Fainberg (57) ABSTRACT

Disclosed herein are systems and method for classifying objects in an image using a color-based neural network. A method may include: training a neural network to classify an object in a given image into a color class from a set of color classes; determining, from the set of color classes, a subset of color classes that are anticipated to be in a received input image based on image metadata; generating a matched mask input indicating the subset; inputting both the input image and the matched mask input into the neural network, wherein the neural network is configured to: determine a first semantic embedding of the input image and the matched mask input; outputting a color class associated with a second semantic embedding with a least amount of distance to the first semantic embedding from a plurality of semantic embeddings.

18 Claims, 5 Drawing Sheets

SYSTEMS AND METHODS FOR COLOR-BASED OUTFIT CLASSIFICATION USING SEMANTIC EMBEDDINGS

CROSS-REFERENCE TO RELATED APPLICATIONS

This application claims the benefit of U.S. Provisional Application No. 63/212,181, filed Jun. 18, 2021, which is herein incorporated by reference.

FIELD OF TECHNOLOGY

The present disclosure relates to the field of computer vision, and, more specifically, to systems and methods for color-based outfit classification using semantic embeddings.

BACKGROUND

Outfit classification is important for various industries such as security, employment, sports, etc. For example, if a security camera is installed in the street, outfit classification can be used for distinguishing between law enforcement and average pedestrians. In another example, if a sports broadcast is tracking players, outfit classification can be used for distinguishing players on opposing teams.

Color-based outfit classification may be used as a quick method in which feature extraction is relatively simple as compared to classification schemes that extract several attributes (e.g., pants, shirt, collar, shoes, etc.). In the case of sports, color-based outfit classification allows to significantly reduce track switches between players which have different outfits. This increases tracking accuracy and reduces post processing work.

Although color-based outfit classification offers speed because of its simplicity, depending on the quality of training dataset, the quality of the input image, and the likeness of colors, the accuracy of the classification can be inconsistent. For example, in a sports broadcast, the players appear small depending on the camera view and certain player uniforms look similar (e.g., a black uniform at a distance may look like a dark blue uniform). Accordingly, the training dataset needs to be large to cover all possible outfits and to distinguish similar but different outfits colors.

There thus exists a need for fast color-based outfit classification with high accuracy.

SUMMARY

In one exemplary aspect, the techniques described herein relate to a method for classifying objects in an image using a color-based neural network, the method including: training, with a dataset including a plurality of images, a neural network to classify an object in a given image into a color class from a set of color classes each representing a distinct color, wherein the color class represents a predominant color of the object; receiving an input image depicting at least one object belonging to the set of color classes; determining, from the set of color classes, a subset of color classes that are anticipated to be in the input image based on metadata of the input image; generating a matched mask input indicating the subset set of color classes in the input image; inputting both the input image and the matched mask input into the neural network, wherein the neural network is configured to: determine a first semantic embedding of the input image and the matched mask input; compare the first semantic embedding to a plurality of semantic embeddings of the plurality of images; and identify, based on the comparison, a second semantic embedding with a least amount of distance to the first semantic embedding; and outputting a color class associated with the second semantic embedding.

In some aspects, the techniques described herein relate to a method, wherein the training further includes: for each anchor image from the plurality of images, identifying a positive image that shares a color class with the anchor image and a negative image that does not share a color class with the anchor image; determining a respective color mask input for each of the anchor image, the positive image, and the negative image; calculating semantic embeddings for each of the anchor image, the positive image, and the negative image with their respective color mask input; and minimizing a triplet loss cost function including the semantic embeddings by updating weights used to generate the semantic embeddings.

In some aspects, the techniques described herein relate to a method, wherein calculating the semantic embeddings includes: calculating a first respective semantic embedding of the anchor image and its associated color mask input; calculating a second respective semantic embedding of the positive image and its associated color mask input; and calculating a third respective semantic embedding of the negative image and its associated color mask input.

In some aspects, the techniques described herein relate to a method, wherein minimizing the triplet loss cost function includes: for each triplet pairing of the plurality of images: determining a first distance between the first respective semantic embedding and the second respective semantic embedding; determining a second distance between the first respective semantic embedding and the third respective semantic embedding; calculating a respective difference between the second distance and the first distance; summing each respective difference; and minimizing the summation using gradient descent.

In some aspects, the techniques described herein relate to a method, wherein identifying the positive image and the negative image includes: selecting, from the plurality of images, a first image that shares a color class label with the anchor image, wherein the first image is the positive image; identifying, from the plurality of images, a second image that does not share a color class label with the anchor image; and in response to determining that a color mask input of the second image matches a color mask input of the anchor image, selecting the second image as the negative image.

In some aspects, the techniques described herein relate to a method, wherein identifying the positive image and the negative image includes: selecting, from the plurality of images, a first image that shares a color class label with the anchor image, wherein the first image is the positive image; identifying, from the plurality of images, a second image that does not share a color class label with the anchor image; and in response to determining that a color mask input of the second image does not match a color mask input of the anchor image, selecting the second image as the negative image.

In some aspects, the techniques described herein relate to a method, wherein the metadata of the input image includes a timestamp and an identifier of a source location of the input image, further including: identifying, in a database that maps timestamps to color classes, a list of color classes that are associated with the timestamp of the input image; and including, in the subset of color classes, color classes in the list.

In some aspects, the techniques described herein relate to a method, wherein the database is provided by the source location.

In some aspects, the techniques described herein relate to a method, wherein the neural network is a siamese neural network.

In some aspects, the techniques described herein relate to a method, wherein the input image is a video frame of a livestream, and wherein the neural network classifies the at least one object in real-time.

In some aspects, the techniques described herein relate to a method, wherein the at least one object is a person wearing an outfit of a particular color.

It should be noted that the methods described above may be implemented in a system comprising a hardware processor. Alternatively, the methods may be implemented using computer executable instructions of a non-transitory computer readable medium.

In some aspects, the techniques described herein relate to a system for classifying objects in an image using a color-based neural network, the system including: a hardware processor configured to: train, with a dataset including a plurality of images, a neural network to classify an object in a given image into a color class from a set of color classes each representing a distinct color, wherein the color class represents a predominant color of the object; receive an input image depicting at least one object belonging to the set of color classes; determine, from the set of color classes, a subset of color classes that are anticipated to be in the input image based on metadata of the input image; generate a matched mask input indicating the subset set of color classes in the input image; input both the input image and the matched mask input into the neural network, wherein the neural network is configured to: determine a first semantic embedding of the input image and the matched mask input; compare the first semantic embedding to a plurality of semantic embeddings of the plurality of images; and identify, based on the comparison, a second semantic embedding with a least amount of distance to the first semantic embedding; and output a color class associated with the second semantic embedding.

In some aspects, the techniques described herein relate to a non-transitory computer readable medium storing thereon computer executable instructions for classifying objects in an image using a color-based neural network, including instructions for: training, with a dataset including a plurality of images, a neural network to classify an object in a given image into a color class from a set of color classes each representing a distinct color, wherein the color class represents a predominant color of the object; receiving an input image depicting at least one object belonging to the set of color classes; determining, from the set of color classes, a subset of color classes that are anticipated to be in the input image based on metadata of the input image; generating a matched mask input indicating the subset set of color classes in the input image; inputting both the input image and the matched mask input into the neural network, wherein the neural network is configured to: determine a first semantic embedding of the input image and the matched mask input; compare the first semantic embedding to a plurality of semantic embeddings of the plurality of images; and identify, based on the comparison, a second semantic embedding with a least amount of distance to the first semantic embedding; and outputting a color class associated with the second semantic embedding.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for color-based outfit classification. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
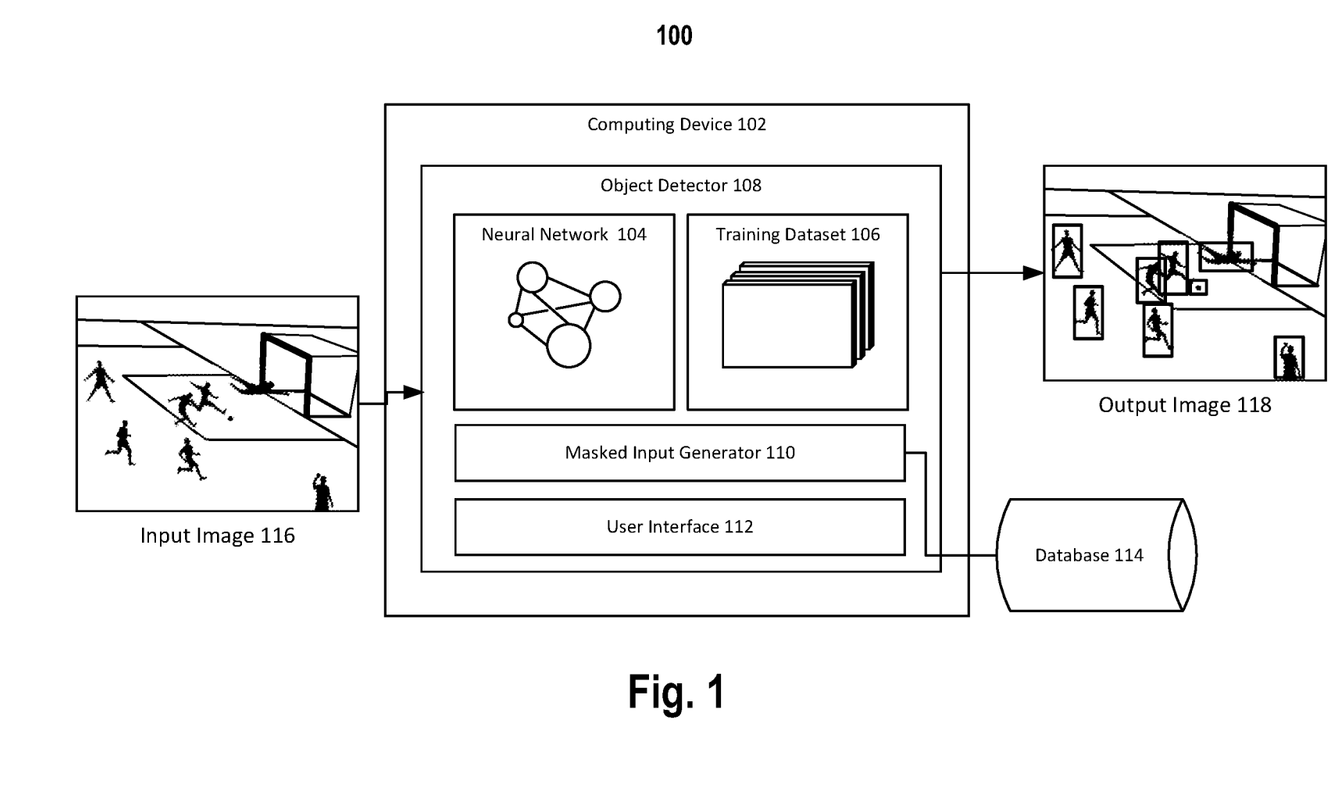
FIG. 1 is a block diagram illustrating a system for color-based outfit classification using a neural network.

FIG. 1 is a block diagram illustrating system 100 for color-based outfit classification using a neural network. In an exemplary aspect, system 100 includes a computing device 102 that stores neural network 104 and training dataset 106 in memory. Neural network 104 may be an image classifier that identifies an object in an image and outputs a label. Neural network 104 may also be an image classifier that identifies an object in an image and generates a boundary around the object. In some aspects, neural network 104 may be used to track an object belonging to a particular color class across multiple image frames (e.g., in a video).

Object detector 108 is a software module that comprises neural network 104, training dataset 106, masked input generator 110, and user interface 112. User interface 112 accepts an input image 116 and provides output image 118. In some aspects, neural network 104 and training dataset 106 may be stored on a different device than computing device 102. Computing device 102 may be a computer system (described in FIG. 5) such as a smartphone. If neural network 104 and/or training dataset 106 are stored on a different device (e.g., a server), computing device 102 may communicate with the different device to acquire information about the structure of neural network 104, code of neural network 104, images in training dataset 106, etc. This communication may take place over a network (e.g., the Internet). For example, object detector 108 may be split into a thin client application and a thick client application. A user may provide input image 116 via user interface 112 on computing device 102. Interface 112, in this case, is part of the thin client. Subsequently, input image 116 may be sent to the different device comprising the thick client with neural network 104 and training dataset 106. Neural network 104 may yield output image 118 and transmit it to computing device 102 for output via user interface 112. In some aspects, neural network 104 is a convolutional siamese neural network.

Consider an example in which input image 116 is a frame of a real-time video stream depicting multiple objects. This video stream may be of a soccer match and the multiple objects may include a soccer ball and humans (e.g., players, coaches, staff, fans, etc.). As shown in FIG. 1, the image may be a far-view of the soccer field (e.g., a broadcast view). Training dataset 106 may include a plurality of images each depicting one or more objects (in this case, the objects are players and staff).

Figure 2:
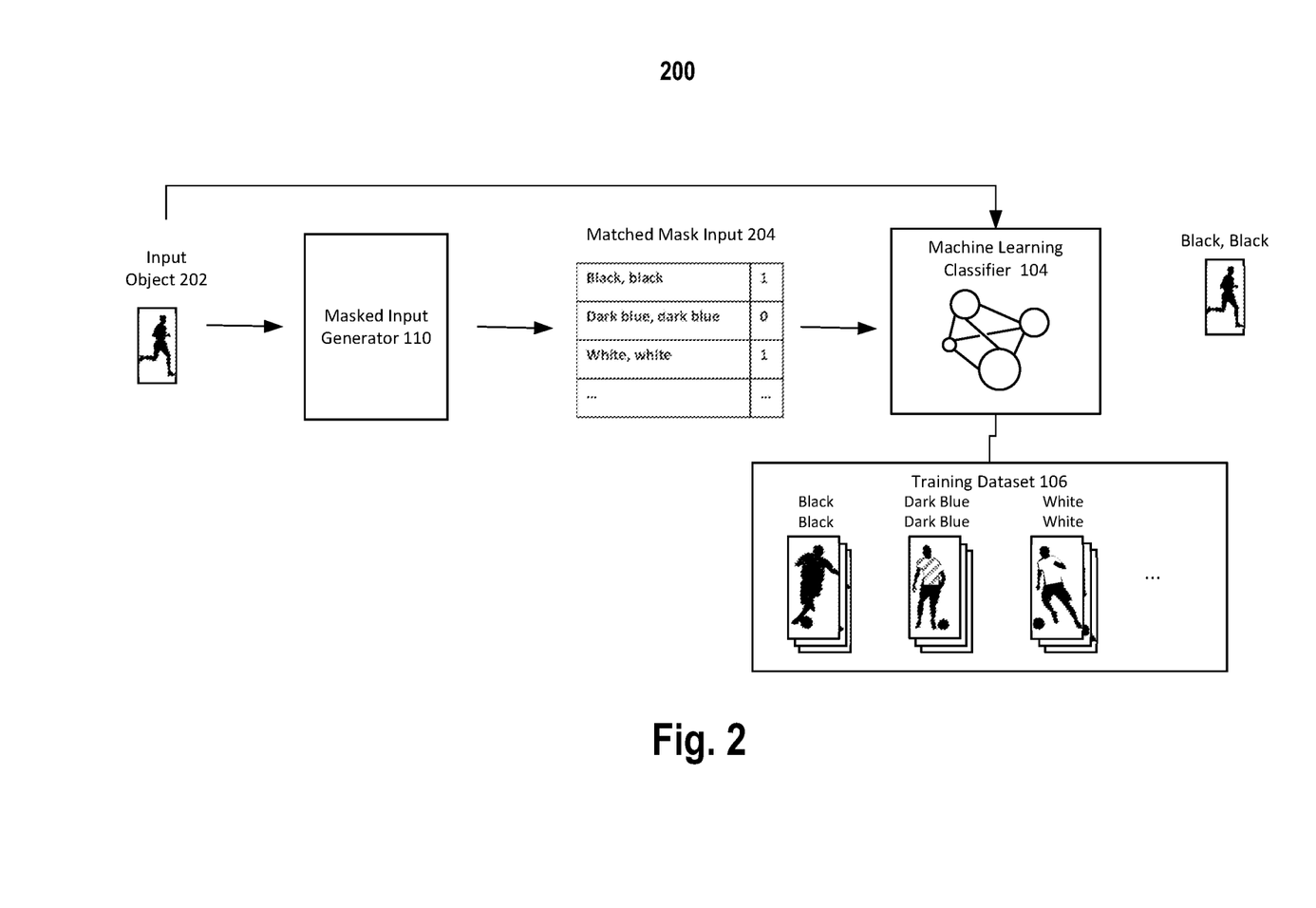
FIG. 2 is a diagram illustrating an example of an image being classified using a color mask input.

FIG. 2 is a diagram illustrating example 200 of an image being classified using a color mask input. The image may comprise input object 202.

In an exemplary aspect, neural network 104 is trained using training dataset 106 to classify an object in a given image into a color class from a set of color classes each representing a distinct color. For example, an object may be a person wearing an outfit of a particular color. The color class thus represents a predominant color of the object. For example, input object 202 is an athlete wearing a black jersey. The set of color classes may include different colors of jerseys that athletes wear. Suppose that a league has thirty teams, each with two outfits. This indicates that there are sixty jerseys with unique color schemes and thus the set of color classes has a size of 60 classes. Some of these jerseys may appear similar, such as two teams that both have red jerseys. In some cases, the red jerseys may each have different shades, but may be close enough for a misclassification by a machine learning algorithm. This is because in different lighting and in different cameras, a single color will look different in an image.

In response to receiving an input image depicting at least one object belonging to the set of color classes, object detector 108 determines, from the set of color classes, a subset of color classes that are anticipated to be in the input image based on metadata of the input image, and generates a matched mask input indicating the subset set of color classes in the input image.

In some aspects, the matched mask input is an input vector that indicates which color classes from the set of color classes can possibly be present in an image. For example, in a soccer match, there are two teams that play in a single game. Training dataset 106 may include very similar colors, for example, for a black color, there is a similar dark blue color. A 60-class classifier will have problems distinguishing between black and dark blue and may misclassify. However, a typical soccer game has just 5 colors (e.g., team1 player, team1 goalkeeper, team2 player, team2 goalkeeper, referee) and these colors are contrasting. A "5-class" classifier will be more effective in identifying colors (i.e., a smaller size than the full set of color classes). The match masked input serves as a hint of which colors are present in an image. In this example, matched mask input 204 may be a 60-dimensional binary vector with 5 ones and 95 zeros). For example, the matched mask input may indicate that a team with black colors and a team with white colors is playing. Neural network 104 can then narrow its approach by applying a big penalty when predicting color classes that are not in the mask during training. One approach to this is to apply the matched masked binary vector to, for example, a softmax layer output, which results in probabilities for the non-present colors to go to zero. This prevents the classifier from selecting the non-present colors as the final color class. Without the matched mask input, neural network 104 may misclassify a black jersey with dark blue, grey, etc., all in one image.

In some aspects, the matched mask input further identifies similar classes that the at least one object in an input image does not belong to. For example, object detector 108 may group colors of the same shade and/or similar colors. A first group may include colors such as dark purple, indigo, navy, etc. A second group may include colors such as yellow, light orange, beige, gold, etc. Because a colored outfit may appear different depending on lighting (e.g., a navy color jersey may appear as blue in direct sunlight and as black in a shaded area), a classifier may be unable to determine an exact matching color. This is especially difficult in the image frames where multiple lighting sources are present.

For example, a portion of a soccer field may be covered in sunlight and remainder may be shaded. For a conventional 60-class classifier, a player wearing a navy jersey may run from a sunlit portion to a shaded portion, and the classifier may incorrectly identify the person as wearing two or more colors based on player position. More specifically, suppose that in a first image frame captured at time t1, a player wearing a navy jersey is identified and the color classifier classifies the color of the jersey as blue. Suppose that in the first image frame, the player is standing in a portion of the environment that is sunlit. Accordingly, colors appear brighter than they actually are. In a second image frame captured at time t2, the player is identified again and the color jersey is classified as black. In this image frame, the player may be standing in a portion of the environment that is shaded. Accordingly, colors appear darker than they actually are. Suppose that in a third image frame captured at time t3, the player is identified again the color jersey is classified as navy. In this case, it may be past sundown and stadium lights may be illuminating the field. However, two of the three classifications above are incorrect. If the objective of the classifier is to distinguish between players or track them as they move along the field, the classifier's three distinct class outputs may prevent the objective from being met. The classifier may instead believe that there are three different players on the field at different times.

To eliminate this, the mask input may be utilized along with information about similar classes. Consider the following grouping of similar classes:

| Group 1 | Group 2 | Group 3 | ... | Group N |
|---|---|---|---|---|
| Yellow | Navy | White | ... | Color 1 |
| Beige | Indigo | Light Gray | ... | Color 2 |
| Gold | Black | Silver | ... | ... |
| Light Orange | Blue | Light Blue | ... | Color N |

The groupings may be stored as a data structure in memory accessible to object detector 108. A 60-class classifier that can classifier any of the colors above and more may identify at t1, the color worn by the player as blue. This color falls under group 2. At t2, the color is classified as black, which also falls under group 2. At t3, the color is classified as navy, which falls under group 2 as well.

Suppose that the mask input indicates that the image frame includes a navy color (e.g., the metadata states that a team with a navy jersey is playing). Object detector 108 determines that navy is in group 2. In response to determining the group of the color in the mask input, object detector 108 reclassifies all outputs of the color classifier (e.g., classifier 104) into a "true" color based on a matching group. Therefore, for the frame captured at time t1, the output "blue" is switched to "navy" because both navy (the actual color) and blue share the same group. Likewise, for the frame captured at time t2, the output "black" is switched to navy because both navy and black share the same group.

This allows for color classes that are definitely not in the input image to be removed, preventing misclassification. This unifies classifications within one frame. In other words, if two teams are playing, the outputs are solely the colors associated with the teams rather than different shades caused by lighting/weather. For example, two members on the same team will be classified as such even if their jerseys appear different when one player stands in a sunlit portion and another stands in a shaded portion of a field. The reclassification also unifies classifications for multiple image frames that share a mask input. For example, a player that runs from one portion with a first light setting into a different portion with a second light setting over two image frames will be identified by the same color class.

In order to determine which colors to include in the subset of color classes, mask input generator 110 may utilize the metadata associated with the input image. For example, the metadata may include a timestamp of the input image and an identifier of the source location where the input image came from. In the case of a soccer match, the timestamp may originate from a live video stream. For example, the input image may be a video frame of a livestream, and wherein the neural network classifies the at least one object in real-time. The broadcast source may provide access to database 114, that maps timestamps to color classes. For example, database 114 may indicate when certain teams are playing soccer at a given time. In response to determining that the timestamp of the input image corresponds to a soccer match between two particular teams, mask input generator 110 may identify a list of color classes that are associated with the timestamp of the input image and including, in the subset of color classes, color classes in the list.

In another example, the video stream may be security camera footage. A user may be interested in tracking the path of a security guard in an office. Suppose that employees of the office each have their own uniform. For example, security officers may wear black, janitors may wear dark blue, secretaries may wear light blue, etc. Accordingly, neural network 104 may be trained to receive an input image of an employee and classify the color class. In a conventional classifier, security officers and janitors may be misclassified due to the similarity of their uniform colors. However, mask input generator 110 may refer to a database that indicates when certain employees are present at the office. Suppose that the input image is taken at 9:00 am. At this time, it is possible that janitors are not present and security officers are present at the office. Generator 110 may thus generate an input vector that indicates a "0" for dark blue and a "1" for black.

Object detector 108 then inputs both the input image and the matched mask input into a neural network. For example, both object 202 and input 204 may be input into neural network 104. Neural network 104 is configured to classify the at least one object into at least one color class of the subset of color classes. More specifically, neural network 104 determines, for each respective color class in the set of color classes, a respective probability of the at least one object belonging to the respective color class. Neural network 104 then adjusts the respective probability based on whether the respective color class is present in the matched mask input (e.g., if set to "0" in the matched mask input, set the probability to 0). Object detector 108 then outputs the at least one color class.

Figure 3:
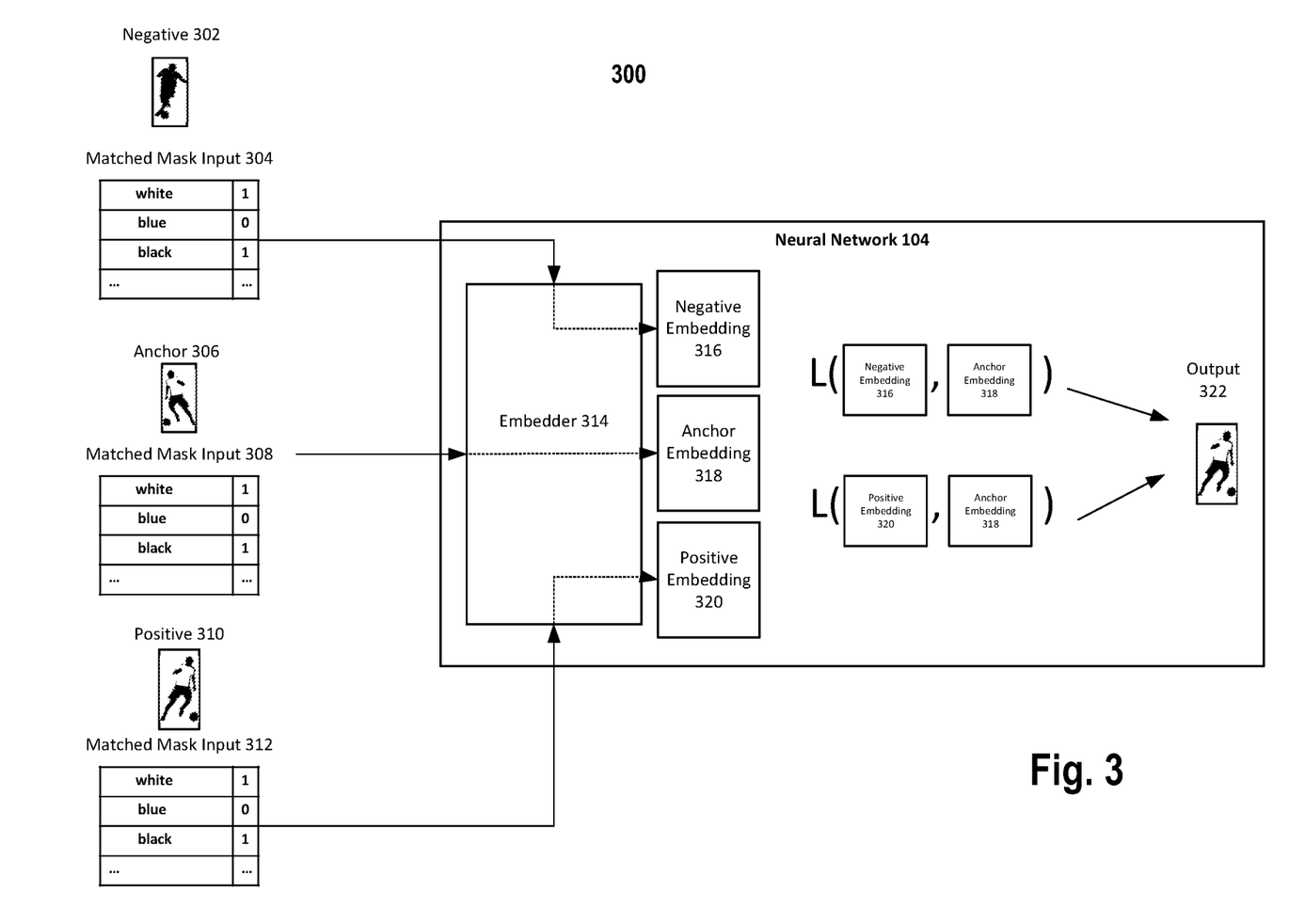
FIG. 3 is a diagram illustrating an example of an image being classified using semantic embeddings.

FIG. 3 is a diagram illustrating example 300 of an image being classified using semantic embeddings. More specifically, neural network 104 is described in greater detail. In some aspects, neural network 104 may be a siamese convolutional neural network. In some aspects, embedder 314 may comprise the embedding layers of known image classification neural networks such as FaceNet, VGG-19, etc., (e.g., the layers other than the fully connected layers). In order to understand how neural network 104 behaves when provided with an input image, it is important to understand how neural network 104 is trained. Training dataset 106 may comprise a plurality of pre-classified images of people in different outfit colors (e.g., see FIG. 2). The labels of the pre-classification may indicate the predominant color of each outfit. For example, anchor image 306 is predominately white and negative image 302 is predominantly black.

In an exemplary aspect, each image in the training dataset is accompanied by a matched mask input that indicates the possible colors that were present in a given location at the time the respective image was generated. For example, anchor image 306 may have been captured during a game in which one team wore black jerseys and another team wore white jerseys. Accordingly, matched mask input 308 includes a "1" at the black and the white vector regions and a "0" for all other colors in the set of color classes.

Figure 4:
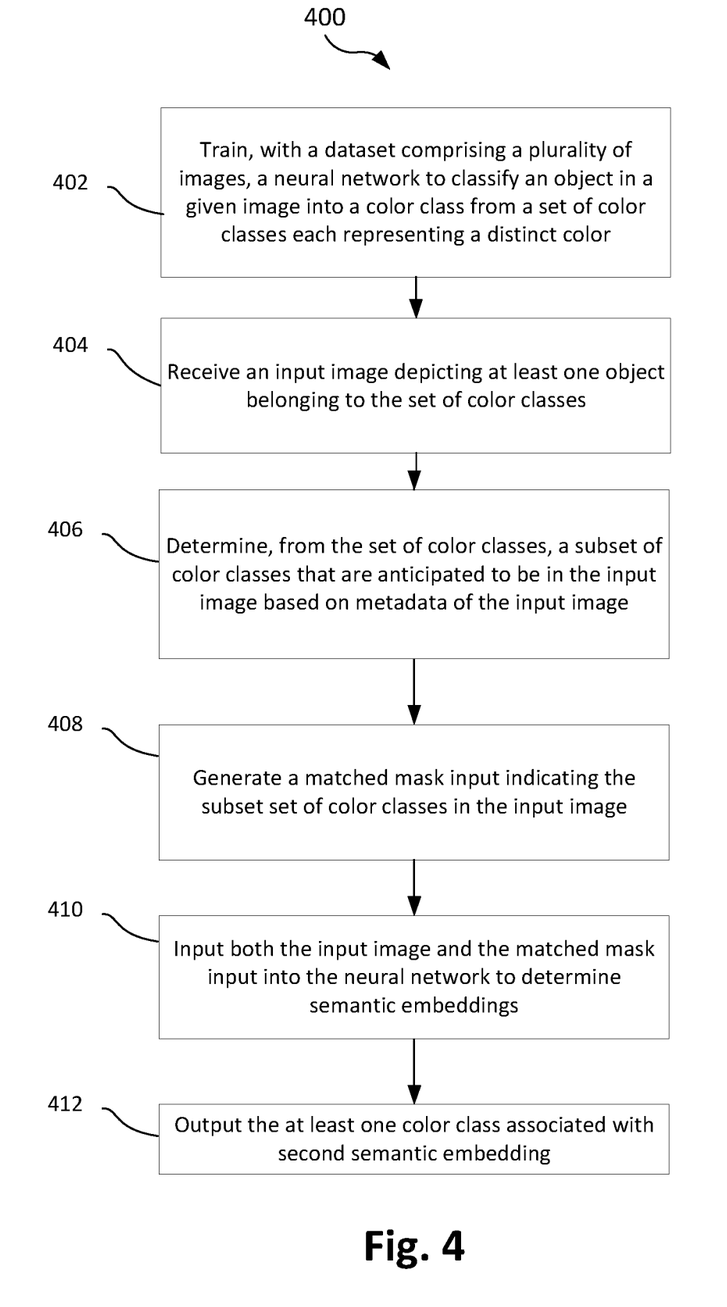
FIG. 4 illustrates a flow diagram of a method for color-based outfit classification.

Training neural network 104 involves dividing training dataset 106 into triplet pairs. Each triplet includes an anchor image (e.g., 306), a positive image (e.g., 310) and a negative image (e.g., 302). On a technical level, for each anchor image from the plurality of images, object detector 108 may be configured to identify a positive image that shares a color class (e.g., white) with the anchor image and a negative image that does not share a color class with the anchor image (e.g., black). This indicates that there needs to be multiple examples of an anchor image (where one of them can be selected as a positive image for the anchor image). In FIG. 4, positive image 310 and anchor image 306 are both pre-classified as having the color class "white."

Object detector 108 further determines a respective color mask input for each of the anchor image, the positive image, and the negative image. For example, object detector 108 retrieves, from training dataset 106, matched mask input 304 for negative image 302, matched mask input 308 for anchor image 306, and matched mask input 312 for positive image 310. Neural network 104 is then used to calculate semantic embeddings for each of the anchor image, the positive image, and the negative image with their respective color mask input. For example, embedder 314 calculates a first respective semantic embedding (e.g., anchor embedding 318) of the anchor image and its associated color mask input. Embedder 314 calculates a second respective semantic embedding (e.g., positive embedding 320) of the positive image and its associated color mask input. Embedder 314 calculates a third respective semantic embedding (e.g., negative embedding 316) of the negative image and its associated color mask input. Each embedding is a low-dimensional vector that represents a given input image.

Neural network 104 generates each embedding using weight vectors that are used in certain layers of embedder

314. Training involves updating said weights such that the semantic embeddings between common color classes are closer and semantic embeddings of different color classes are further apart. In some aspects, these distances are characterized by a triplet loss cost function. In some aspects, object detector 108 minimizes the triplet loss cost function comprising the semantic embeddings by updating weights used to generate the semantic embeddings.

For example, for each triplet pairing of the plurality of images, object detector 108 may determine a first distance between the first respective semantic embedding (i.e., of the anchor image) and the second respective semantic embedding (i.e., of the positive image). Object detector 108 may then determine a second distance between the first respective semantic embedding and the third respective semantic embedding (i.e., of the negative image). Object detector 108 may then calculate a respective difference between the second distance and the first distance. In some aspects, a small margin value (e.g., 0.2) may be added to the respective difference in order to prevent the embedder 314 from making all embeddings equal to 0. In some aspects, object detector 108 may calculate a sum of each respective difference and margin value for all triplet pairs. Object detector 108 may then minimize the summation using gradient descent by updating the weights of embedder 314.

Consider the first respective semantic embedding to be represented as f(A), the second respective semantic embedding to be represented as f(P), and the third respective semantic embedding to be represented as f(N). In some aspects, the cost function is $L=\max(\|f(A)-f(P)\|^2-\|f(A)-f(N)\|^2+\text{margin}, 0)$, margin=0.2. Here, the difference between the first distance and the second distance is added to a margin value for a particular triplet pair. The maximum value between the sum and 0 is determined as the cost for that triplet pair. Thus, if the difference between an anchor image and the positive image is too large and the difference between the anchor image and the negative image is too small, the loss will be greater than 0 (i.e., correction is needed). The triplet loss cost function determines a sum of each L calculated for an image triplet. In some aspects, gradient descent is used to minimize the cost function.

It should be noted that the cost function can easily be minimized if the positive and negative images are selected at random. For example, if the anchor image is white and the negative image is dark blue, the embeddings will be quite different. Neural network 104 is better trained when closer negative images are selected for an anchor image. For example, a neural network that can easily distinguish between white and dark blue, but may still struggle to distinguish between white and light gray. In contrast, a neural network that can easily distinguish between white and light gray, should also easily distinguish between white and dark blue. Based on this, object detector 108 may use a similar color as a negative image to an anchor image. In some aspects, object detector 108 may select the positive and negative images based on the matched mask input.

As mentioned before, object detector 108 may group colors of the same shade and/or similar colors. Referring to the data structure described previously, if anchor image 306 is "white," object detector 108 may select negative image 302 as "light gray" in response to determining that both white and light gray are part of the same group (i.e. group 3). Thus, in general, object detector 108 may select, from the plurality of images, a first image that shares a color class label with the anchor image (e.g., blue), wherein the first image is the positive image, and identify, from the plurality of images, a second image that does not share a color class label with the anchor image, but is part of the same group of colors.

In some aspects, in further response to determining that a color mask input of the second image matches a color mask input of the anchor image, object detector 108 may select the second image as the negative image. The benefit of considering the mask input when selecting positive and negative images is the removed extra step of determining whether the smallest distance (between the positive embedding and the negative embedding) has a color in the masked input. Suppose that an anchor image is compared with a positive image and the semantic embeddings difference is the lowest relative to the negative image. However, suppose that the positive image is not the same color class as the true color class of the anchor image (e.g., the true color class is white and the color class of the positive image is light gray). Furthermore, suppose that this misclassification could have been corrected if object detector 108 knew whether the mask inputs are the same or not. For example, if the input image is known to be one of white or black (based on the mask input), the smallest difference will be with a positive image that has a class of white. When the mask inputs of images are the same, the object detector 108 enables for a more accurate determination. It should be noted, however, that this occurs in a controlled environment because soccer games typically feature jerseys that are clearly different (e.g., contrasting).

In some aspects, in response to determining that a color mask input of the second image does not match a color mask input of the anchor image, object detector 108 may select the second image as the negative image. In this scenario, the purpose is to test the neural network in a different manner. When the mask inputs are not matching, the possibilities of having similar colors be compared to one another increase. Accordingly, if the mask input of an anchor image indicate color classes of white and black, whereas the mask input of a negative image indicate light gray and navy, the neural network learns to identify the differences between non-matching colors (e.g., difference between white and light gray instead of the difference between white and white). When object detector 108 knows that the mask inputs do not match, object detector 108 knows that the true color class will not be classified. Instead, object detector 108 will get the closest match instead relative to the negative and positive image mask inputs.

FIG. 4 illustrates a flow diagram of method 400 for color-based outfit classification using semantic embeddings. The description of FIG. 3 described how neural network is trained. This is captured in 402 of method 400, where object detector 108 trains, with a dataset (e.g., training dataset 106) comprising a plurality of images, a neural network (e.g., network 104) to classify an object in a given image into a color class from a set of color classes each representing a distinct color.

Subsequent to training, at 404, object detector 108 receives an input image (e.g., input image 116) depicting at least one object belonging to the set of color classes. At 406, masked input generator 110 determines, from the set of color classes, a subset of color classes that are anticipated to be in the input image based on metadata of the input image (e.g., as described in the description of FIG. 2). At 408, masked input generator 110 generates a matched mask input indicating the subset set of color classes in the input image. At 410, object detector 108 inputs both the input image and the matched mask input into the neural network.

The trained neural network is configured to determine a first semantic embedding of the input image and the matched mask input, and compare the first semantic embedding to a plurality of semantic embeddings of the plurality of images. For example, the neural network may determine a distance between the first semantic embedding and each of the semantic embeddings of the training images in the training dataset. The neural network then identifies, based on the comparison, a second semantic embedding with a least amount of distance to the first semantic embedding. At 412, object detector 108 outputs (e.g., via user interface 112) a color class associated with the second semantic embedding for each object detected in the input image. In some aspects, object detector 108 may also output the image in a boundary (e.g., as output 322) on the input image (as shown in output image 118). For example the at least one object may be a soccer player wearing a red jersey. The second semantic embedding may be of a training image depicting a soccer player wearing a red jersey.

Figure 5:
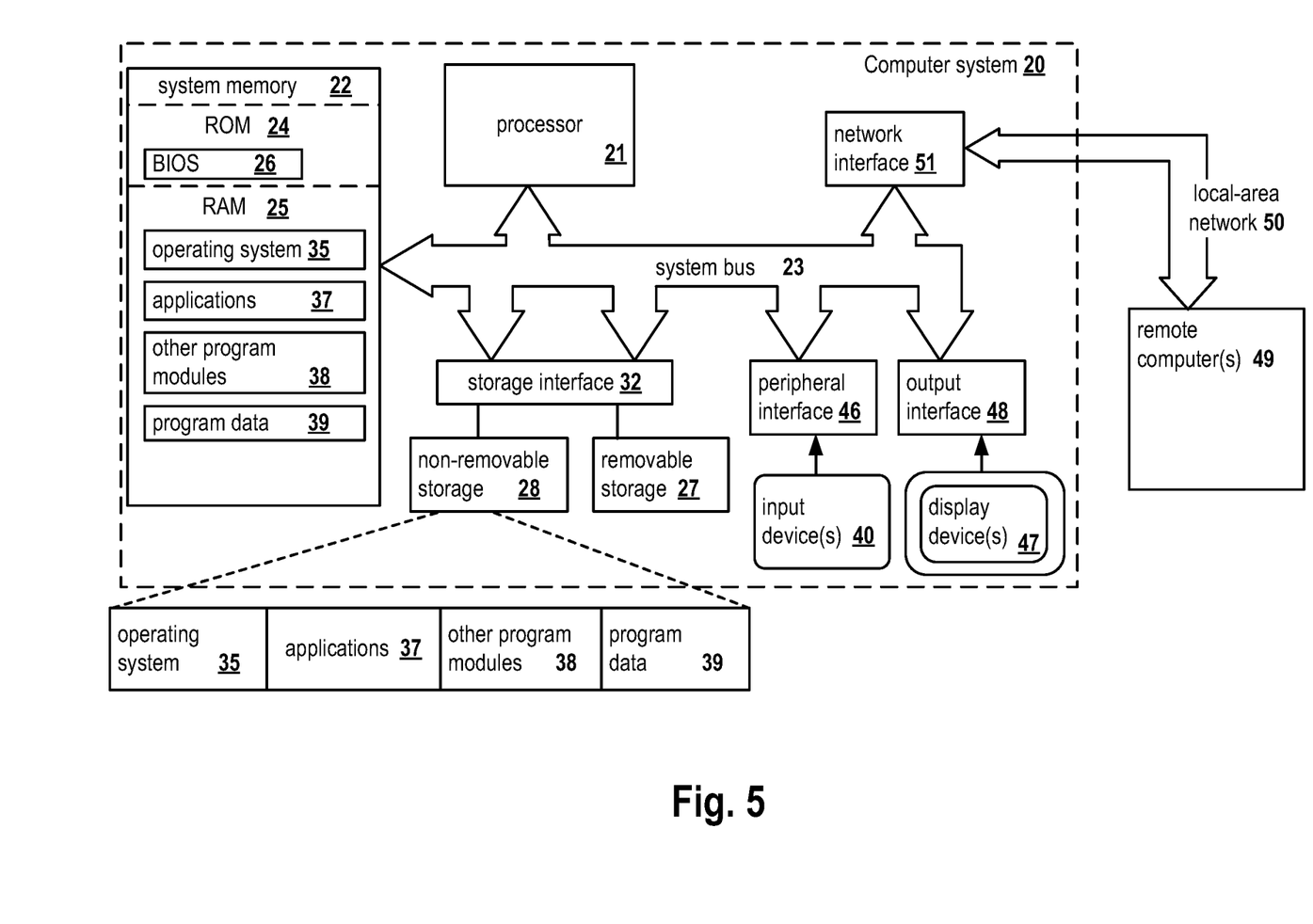
FIG. 5 presents an example of a general-purpose computer system on which aspects of the present disclosure can be implemented.

FIG. 5 is a block diagram illustrating a computer system 20 on which aspects of systems and methods for color-based outfit classification using semantic embeddings may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for classifying objects in an image using a color-based neural network, the method comprising:
  training, with a dataset comprising a plurality of images, a neural network to classify an object in a given image into a color class from a set of color classes each representing a distinct color, wherein the color class represents a predominant color of the object;
  wherein the training further comprises:
    for each anchor image from the plurality of images, identifying a positive image that shares a color class with the anchor image and a negative image that does not share a color class with the anchor image;
    determining a respective color mask input for each of the anchor image, the positive image, and the negative image;
    calculating semantic embeddings for each of the anchor image, the positive image, and the negative image with their respective color mask input; and
    minimizing a triplet loss cost function comprising the semantic embeddings by updating weights used to generate the semantic embeddings;
  receiving an input image depicting at least one object belonging to the set of color classes;
  determining, from the set of color classes, a subset of color classes that are anticipated to be in the input image based on metadata of the input image;
  generating a matched mask input indicating the subset set of color classes in the input image;
  inputting both the input image and the matched mask input into the neural network, wherein the neural network is configured to:
    determine a first semantic embedding of the input image and the matched mask input;
    compare the first semantic embedding to a plurality of semantic embeddings of the plurality of images; and
    identify, based on the comparison, a second semantic embedding with a least amount of distance to the first semantic embedding; and
  outputting a color class associated with the second semantic embedding.

2. The method of claim 1, wherein calculating the semantic embeddings comprises:

calculating a first respective semantic embedding of the anchor image and its associated color mask input;

calculating a second respective semantic embedding of the positive image and its associated color mask input; and calculating a third respective semantic embedding of the negative image and its associated color mask input.

3. The method of claim 2, wherein minimizing the triplet loss cost function comprises:

for each triplet pairing of the plurality of images:
determining a first distance between the first respective semantic embedding and the second respective semantic embedding;
determining a second distance between the first respective semantic embedding and the third respective semantic embedding;
calculating a respective difference between the second distance and the first distance;
summing each respective difference; and
minimizing the summation using gradient descent.

4. The method of claim 1, wherein identifying the positive image and the negative image comprises:

selecting, from the plurality of images, a first image that shares a color class label with the anchor image, wherein the first image is the positive image;
identifying, from the plurality of images, a second image that does not share a color class label with the anchor image; and
in response to determining that a color mask input of the second image matches a color mask input of the anchor image, selecting the second image as the negative image.

5. The method of claim 1 wherein identifying the positive image and the negative image comprises:

selecting, from the plurality of images, a first image that shares a color class label with the anchor image, wherein the first image is the positive image;
identifying, from the plurality of images, a second image that does not share a color class label with the anchor image; and
in response to determining that a color mask input of the second image does not match a color mask input of the anchor image, selecting the second image as the negative image.

6. The method of claim 1, wherein the metadata of the input image comprises a timestamp and an identifier of a source location of the input image, further comprising:

identifying, in a database that maps timestamps to color classes, a list of color classes that are associated with the timestamp of the input image; and
including, in the subset of color classes, color classes in the list.

7. The method of claim 6, wherein the database is provided by the source location.

8. The method of claim 1, wherein the neural network is a siamese neural network.

9. The method of claim 1, wherein the input image is a video frame of a livestream, and wherein the neural network classifies the at least one object in real-time.

10. The method of claim 1, wherein the at least one object is a person wearing an outfit of a particular color.

11. A system for classifying objects in an image using a color-based neural network, the system comprising:

a hardware processor configured to:
train, with a dataset comprising a plurality of images, a neural network to classify an object in a given image into a color class from a set of color classes each representing a distinct color, wherein the color class represents a predominant color of the object;
wherein the training further comprises:
for each anchor image from the plurality of images, identifying a positive image that shares a color class with the anchor image and a negative image that does not share a color class with the anchor image;
determining a respective color mask input for each of the anchor image, the positive image, and the negative image;
calculating semantic embeddings for each of the anchor image, the positive image, and the negative image with their respective color mask input; and
minimizing a triplet loss cost function comprising the semantic embeddings by updating weights used to generate the semantic embeddings;
receive an input image depicting at least one object belonging to the set of color classes;
determine, from the set of color classes, a subset of color classes that are anticipated to be in the input image based on metadata of the input image;
generate a matched mask input indicating the subset set of color classes in the input image;
input both the input image and the matched mask input into the neural network, wherein the neural network is configured to:
determine a first semantic embedding of the input image and the matched mask input;
compare the first semantic embedding to a plurality of semantic embeddings of the plurality of images; and
identify, based on the comparison, a second semantic embedding with a least amount of distance to the first semantic embedding; and
output a color class associated with the second semantic embedding.

12. The system of claim 11, wherein the hardware processor is configured to calculate the semantic embeddings by:

calculating a first respective semantic embedding of the anchor image and its associated color mask input;
calculating a second respective semantic embedding of the positive image and its associated color mask input; and
calculating a third respective semantic embedding of the negative image and its associated color mask input.

13. The system of claim 12, wherein the hardware processor is configured to minimize the triplet loss cost function by:

for each triplet pairing of the plurality of images:
determining a first distance between the first respective semantic embedding and the second respective semantic embedding;
determining a second distance between the first respective semantic embedding and the third respective semantic embedding;
calculating a respective difference between the second distance and the first distance;
summing each respective difference; and
minimizing the summation using gradient descent.

14. The system of claim 11, wherein the hardware processor is configured to identify the positive image and the negative image by:

selecting, from the plurality of images, a first image that shares a color class label with the anchor image, wherein the first image is the positive image;

identifying, from the plurality of images, a second image that does not share a color class label with the anchor image; and in response to determining that a color mask input of the second image matches a color mask input of the anchor image, selecting the second image as the negative image.

15. The system of claim 11, wherein the hardware processor is configured to identify the positive image and the negative image by:

selecting, from the plurality of images, a first image that shares a color class label with the anchor image, wherein the first image is the positive image;

identifying, from the plurality of images, a second image that does not share a color class label with the anchor image; and in response to determining that a color mask input of the second image does not match a color mask input of the anchor image, selecting the second image as the negative image.

16. The system of claim 11, wherein the metadata of the input image comprises a timestamp and an identifier of a source location of the input image, and wherein the hardware processor is further configured to:

identify, in a database that maps timestamps to color classes, a list of color classes that are associated with the timestamp of the input image; and include, in the subset of color classes, color classes in the list.

17. The system of claim 16, wherein the database is provided by the source location.

18. A non-transitory computer readable medium storing thereon computer executable instructions for classifying objects in an image using a color-based neural network, including instructions for:

training, with a dataset comprising a plurality of images, a neural network to classify an object in a given image into a color class from a set of color classes each representing a distinct color, wherein the color class represents a predominant color of the object;

wherein the training further comprises:

for each anchor image from the plurality of images, identifying a positive image that shares a color class with the anchor image and a negative image that does not share a color class with the anchor image;

determining a respective color mask input for each of the anchor image, the positive image, and the negative image;

calculating semantic embeddings for each of the anchor image, the positive image, and the negative image with their respective color mask input; and minimizing a triplet loss cost function comprising the semantic embeddings by updating weights used to generate the semantic embeddings;

receiving an input image depicting at least one object belonging to the set of color classes;

determining, from the set of color classes, a subset of color classes that are anticipated to be in the input image based on metadata of the input image;

generating a matched mask input indicating the subset set of color classes in the input image;

inputting both the input image and the matched mask input into the neural network, wherein the neural network is configured to:

determine a first semantic embedding of the input image and the matched mask input;

compare the first semantic embedding to a plurality of semantic embeddings of the plurality of images; and identify, based on the comparison, a second semantic embedding with a least amount of distance to the first semantic embedding; and outputting a color class associated with the second semantic embedding.

\* \* \* \* \*